United States Patent

[11] 3,590,670

[72] Inventors Robert A. Thompson
 Windham;
 Stephen E. Grabkowski, Schenectady, both of, N.Y.; Raymond A. Mathieu, Burlington, Vt.
[21] Appl. No. 809,900
[22] Filed Mar. 24, 1969
[45] Patented July 6, 1971
[73] Assignee General Electric Company

[54] MACHINE TOOL CUTTING INDICATION AND CONTROL
 2 Claims, 2 Drawing Figs.
[52] U.S. Cl. .................................................. 82/1 R, 77/32.7
[51] Int. Cl. .................................................. B23b 3/06

[50] Field of Search.......................................... 82/1, 1.4, 2; 77/32.7

[56] References Cited
UNITED STATES PATENTS
3,095,532  6/1963  Floyd .......................... 82/1.4

Primary Examiner—Francis S. Husar
Attorneys—John F. Ahern, Paul A. Frank, Julius J. Zaskalicky, Frank L. Neuhauser, Oscar B. Waddell and Joseph B. Forman ABSTRACT: A high pass filter of particular characteristics is provided in the signal path from a vibration transducer attached to a machine tool to an indicator which enables the indicator to reliably indicate when the machine tool is performing a cutting operation.

Inventors:
Robert A. Thompson,
Stephen E. Grabkowski,
Raymond A. Mathieu,
by
Their Attorney

MACHINE TOOL CUTTING INDICATION AND CONTROL

The present invention relates to apparatus for providing automatically an indication when a machine tool is performing a machining operation.

The high cost of modern machine tools such as lathes, milling machines, planars and the like, particularly when automatically controlled, has created a need for equipment which will log the time such machines are actually performing a machining operation. It has been found that the utilization of some such machines is not high enough to yield an adequate return on the investment they represent. To improve utilization of such machine tools certain information is required that is best gathered by automatic data-logging equipment. Conventional recorders will log the time that the spindle of the machine tool to which the workpiece is attached is turning, but such time may be and usually is quite different from the actual cutting or machining time of the machine tool.

Accordingly, an object of the present invention is to provide a simple, compact, effective and highly reliable apparatus for providing automatically an indication of time that a machine tool is performing a machining operation.

Another object of the invention is to provide a versatile machine tool cutting indication apparatus which may be attached to any kind of a machine tool and requires no special connections to electrical power circuits or to parts of the machine tool.

Another object is to provide apparatus of the character described which is highly sensitive in response to the performance of machining operations on the machine tool.

In automatically operated machine tools it is desirable in order to save time to rapidly advance cutting tools toward engagement with a workpiece and thereafter provide a desired slower rate of advance into the workpiece.

Accordingly, a further object of the present invention is to provide apparatus which produces a signal which can be used to terminate a rapid advance of a cutting tool into a workpiece before appreciable penetration has been made.

In accordance with an illustrative embodiment of the present invention there is provided an accelerometer physically attached to the machine tool for sensing mechanical vibration and converting such vibrations into electrical signaLs. The electrical signals are amplified and the components thereof below a predetermined frequency are attenuated. The components which are attenuated represent a substantial portion of the energy of the vibrations produced by the machine tool independent of any cutting operation being performed thereon. Accordingly, the predominant portion of the signal energy of the resultant signal corresponds to components produced on the machine tool by the machining operation. Means are provided responsive to a predetermined power level of the resultant signal for actuating an indicating device to provide an indication of the engagement of the cutting tool with the workpiece.

The novel features which are believed to be characteristic of the present invention are set forth in the appended claims. The invention itself, however, together with further objects and advantages thereof may best be understood by reference to the following description taken in connection with the accompanying drawings wherein:

Figure 1:
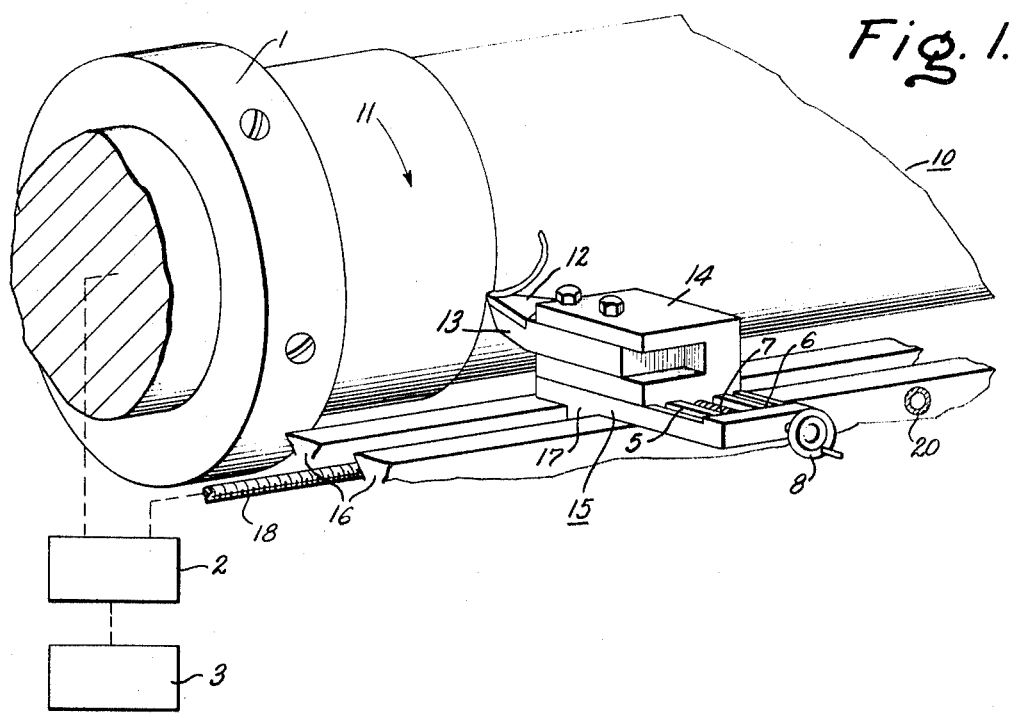
FIG. 1 is a perspective view of a workpiece being machined by a cutting tool mounted on a toolholder assembly.

Referring now to FIG. 1 there is shown a portion of a metallic workpiece 10 supported in a workpiece holder 1. The workpiece holder is mechanically coupled through a gear drive 2 to a drive motor 3 which drives the workpiece 10 in the direction indicated by the arrow 11. A cutting tool 12 is also shown mounted in a toolholder assembly 15. The toolholder assembly 15 includes a toolholder post 14 and a toolholder bed 17 which is mounted on a pair of parallel guideways 16 parallel to the axis of rotation of the workpiece. The toolholder bed is movable along the guideways 16 by means of a drive screw 18 engaging the bed 17 at one end thereof and driven at the other end thereof from the gear drive 2. The cutting tool 12 is mounted to the front end of a toolholder 13 which in turn is clamped to a toolholder post 14. The toolholder post 14 is slidably mounted on a pair of grooves 5 and 6 in the bed which are perpendicular to the guideways 16. A screw member is provided, one end of which engages the post 14 and the other end of which engages the upright side portion of the bed and includes a knob 8 for turning the screw member 7 for effecting engagement and disengagement of the cutting tool 12 with the workpiece 10. The means described above and shown in the drawings for rotating the workpiece and driving the cutting tool are conventional.

In the absence of any cutting operation being performed on the machine tool, that is, when the machine tool is operated so as to produce simple rotation of the workpiece, certain vibrations are produced in the machine tool. Such vibrations arise from various causes, such as imbalances in the rotating parts thereof, for example. We have found that in most machine tools the frequencies of most of such background vibrations are less than about 6,000 cycles per second and that the bulk or the major portion of the vibrational energy thereof is contained in a frequency band from zero up to about 6,000 cycles per second.

When the cutting tool 12 is in engagement with the workpiece, the cutting action causes vibrations to be generated in the workpiece and in the cutting tool. Such vibrations propagate themselves throughout the machine tool very much in the same manner as sound waves are propagated in an elastic medium. We have found that the vibrations produced by the machining operation in a variety of machining operations include frequencies extending over a broad band of frequencies. In most such machining operations we have found that considerable vibrational energy is generated by the machining operation in frequency ranges extending above about 6,000 cycles per second. Our invention to be described in connection with FIG. 2 is based on the foregoing observations.

Figure 2:
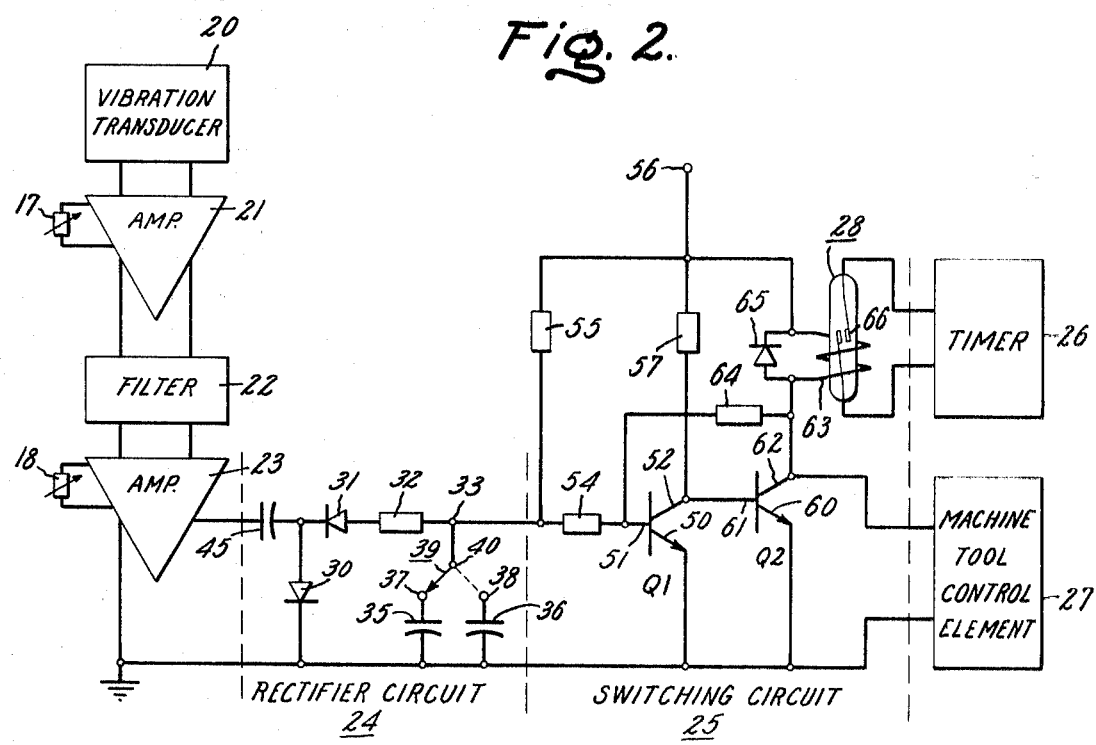
FIG. 2 is a block diagram partly in schematic form showing the indicating and control apparatus of the present invention.

Referring now to FIG. 2 there is shown a diagram of apparatus suitable for connection to the machine tool partially depicted in FIG. 1 to provide an indication of the performance of a machining operation thereon. The apparatus includes a vibration transducer 20, an amplifier 21, a filter 22, a second amplifier 23, a rectifier circuit 24, and a switching circuit 25 including a relay 28, the output of which is shown applied to utilization circuits 26 and 27. The vibrational transducer 20, which may be a piezoelectric or other kind of accelerometer senses vibrations in the machine tool. The accelerometer 20 is shown in FIG. 1 mounted on the tool bed, that is, parallel guideway 16, although any location at which a good signal may be obtained would be suitable. The sensed vibrations are converted into electrical signals which are amplified by the electrical amplifier 21 and subsequently filtered by the filter 22 and may be further amplified again by the filter 23, if desired. It will be appreciated that the amplifiers 21 and 23 and the filter 22 may be incorporated into a single overall circuit for performing the desired degree of application and filtering. Gain control elements 17 and 18 may be provided for adjustment of the operation of the amplifiers 21 and 23, respectively, with which they are associated. The filter 22 functions to attenuate the low frequency components of signal so as to leave in the resultant signal frequency components which predominantly represent vibrations produced by the machining operation alone. The resultant signal actuates a rectifier circuit 24 which drives a bistable switching circuit 25 to actuate a relay 28 to turn on the timer 26 or to actuate the control circuit 27.

In accordance with the present invention, the filter is a high pass filter, that is a filter which attenuates the low frequency components of the electrical signal and passes the high-components. As mentioned above, we have found that attenuation of the components of the signal below about 6,000 cycles provides effective operation of the apparatus. We have found that an overall attenuation of about 18 decibels per octave from the aforementioned 6,000 cycles per second predetermined frequency provides satisfactory operation.

Attention is now directed to the rectifier circuit 24 and the switching circuit 25 shown in schematic form in FIG. 2. The rectifier circuit 24 is of the voltage doubler type including a pair of diodes 30 and 31. The cathode of the diode is connected to ground and the anode thereof is connected to the cathode of diode 31. The anode of diode 31 is connected through a discharge resistance 32 to the output point 33 of the rectifier circuit. A pair of capacitors 35 and 36 are shown of different capacitances, each having one electrode thereof connected to ground and the other electrode thereof connected to separate contacts 37 and 38, respectively, of a single-pole double-throw switch 39, the pole 40 of which is connected to the output point 33. The output from the amplifier 23 is coupled through a coupling capacitor 45 which forms a part of the rectifier circuit 24 to the junction point of diodes 30 and 31. The other output terminal of the amplifier 23 is connected to ground.

The switching circuit 25 includes a pair of NPN transistors Q1 and Q2 connected in a bistable configuration to provide output to a relay 28 which may be a reed relay. The transistor Q1 includes an emitter 50, a base 51 and a collector 52. The emitter 50 is connected to ground. The base 51 is connected through a series resistance 54 to the output point 33 of the rectifier circuit. The output point 33 of the rectifier circuit in turn is connected through a charging resistaNce 55 to the terminal 56 which is connected to the positive terminal of a source of operating potential (not shown), the negative terminal of which is connected to ground. The collector 52 is connected through a load resistor 57 to the positive terminal 56. The transistor Q2 includes an emitter 60, a base 61 and a collector 62. The emitter 60 is connected to ground, the base 61 is connected to the collector 52 of transistor Q1, the collector 62 of transistor Q2 is connected through the solenoid 63 of the reed relay 28 to the positive terminal 56. The collector 62 is also connected through a feedback resistor 64 to the base 51 of transistor Q1. A diode 65 is provided connected across the solenoid 63 of the reed relay to suppress switching transients produced by the breaking of current flow in the solenoid. The contacts 66 of the reed relay are connected to a suitable utilization circuit 26 which may, for example, be a timer. The utilization circuit may also be a control circuit 27 for initiating such action as the slowing of the advance or stopping of advance of a cutting tool into the workpiece as described above.

In the operation of the rectifier circuit 24 and switching circuit 25, assuming initially that substantially no output is being derived from the amplifier 23, the transistor Q1 will be rendered conductive and the transistor Q2 will be rendered nonconductive as Q1 is driven to conduction by a high positive voltage on the base 51 thereof. The conduction of the transistor Q1 develops a large voltage drop across the collector load resistance 57 and accordingly drops the emitter to base driving voltage on Q2 below that which is required to produce conduction therein. The capacitor 35, or capacitor 36 if it is in circuit, is charged to the voltage appearing at the output point 32 which is also the junction point of the resistances 54 and 55.

Now assume that the amplifier 23 is delivering an output signal. Such output signal is rectified by the voltage doubler circuit and tends to charge the capacitor 35 in the opposite direction to which it was charged through charging resistance 55 from positive terminal 56. Expressed in other words, the output signal activates a discharged path for capacitor 35 through discharge resistance 54. The resistance 54 is smaller than resistance 55 and accordingly the capacitor 35 is discharged provided sufficient amplitude of output is provided by the amplifier 23. Preferably a clipper circuit is provided at the output of the amplifier 23 to render the discharge time constant of capacitor 35 independent of the output level thereof. The voltage at the output point 33 will drop in response to the output from the amplifier 23 until it reaches a value which drops the forward emitter to base driving voltage of the transistor Q1 sufficiently to cause a reduction in flow of current therethrough. As a result, voltage on the collector of transistor Q1 rises thereby initiating conduction in transistor Q2. As conduction in transistor Q2 is increased, the voltage on collector of Q2 drops. Such drop in voltage is coupled to the base of transistor Q1 through the resistance 64 thereby providing a rapid attainment of the condition in which transistor Q2 is conductive and transitor Q1 is nonconductive. Conduction through the collector circuit of Q2 causes relay 28 to be energized and the contacts 66 thereof to be closed thereby to energize the utilization circuits 26 and 27.

The gain of the amplifiers 21 and 23 is set to provide sufficient signal from the accelerometer to operate the rectifier circuit 24 to enable capacitor 35 to discharge through its discharge circuit. The filter 22 functions to remove enough of the low frequency components of signal from the accelerometer to render such components insufficient to actuate the rectifier circuit 24 to discharge the capacitor 35. When the apparatus is used with such machine tools as milling machines in which the blades of the milling tool intermittently engage the workpiece, sufficient delay has to be provided so as to assure that the switching circuit 25 remains energized to maintain actuation of the utilization circuits between successive blade contacts of the milling tool. The delay can be appropriately controlled by controlling the discharging time constant of the capacitor between point 33 aNd the ground. In the circuit shown such a control is achieved by substitution in circuit of another capacitor 36 of suitable capacitance requiring a greater time to charge to the voltage which renders transistor Q1 again conductive.

While the invention has been described in a specific embodiment, it will be appreciated that many modifications may be made by those skilled in the art and we intend by the appended claims to cover all such modifications and changes as fall within the true spirit and scope of the invention.

What we claim as new and desire to secure by Letters Patent of the United States is:

1. In combination with a machine tool which includes a workpiece holder and a cutting tool, motor means for moving the workpiece holder in relation to the cutting tool, and means for advancing the workpiece holder in relation to the cutting tool to bring a workpiece attached to the workpiece holder into engagement with the cutting tool for performing a machining operation on the workpiece apparatus for providing an indication of engagement of the cutting tool with the workpiece comprising an accelerometer physically attached to said machine tool for sensing mechanical vibrations therein and converting said vibrations into an electrical signal, amplifying means connected to said accelerometer for amplifying said signal, attenuating means connected to said amplifying means for attenuating the frequency components of said signal below a predetermined frequency, said components representing a substantial portion of the vibrations produced by said machine tool independent of any cutting operation being performed thereon whereby the predominant portion of the signal energy of the resultant signal corresponds to components produced on said machine tool by the machining operation, rectifier means connected to said attenuating means and responsive to a predetermined power level for providing a unidirectional voltage representative of the power level of said resultant signal, a switching circuit connected to the output of said rectifier means and responsive to a predetermined level of said unidirectional voltage to provide an output, an indicating device connected to said switching circuit and responsive to the output thereof to provide an indication of engagement of said cutting tool with said workpiece.

2. The combination of claim 1 in which a capacitor with a resistive discharge path is provided at the output of said rectifier means to receive charge passed through said rectifier means and provide a voltage indicative of the power level of said resultant signal, the time constant of the capacitor with resistive discharge path being sufficiently great to retain the voltage thereon above a predetermined switching level over a period of time greater than the period of time of successive short time interval engagements which a machine tool makes with the workpiece thereby to provide a constant indication of a machining operation being performed thereon.